L. S. LACHMAN.
ARTICLE OF MANUFACTURE OF METAL AND METHOD OF PRODUCING THE SAME.
APPLICATION FILED FEB. 8, 1918.
1,314,816.
Patented Sept. 2, 1919.
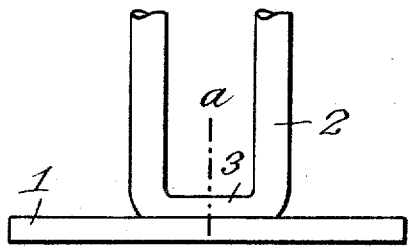
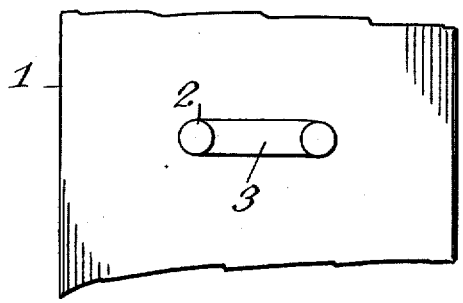
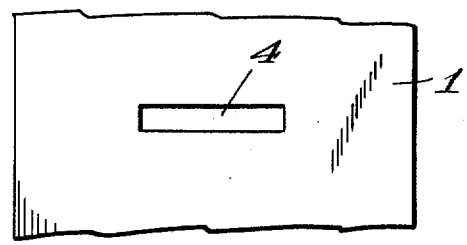
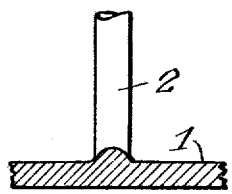
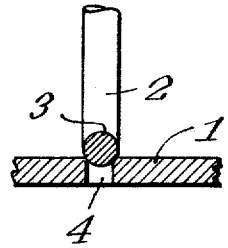
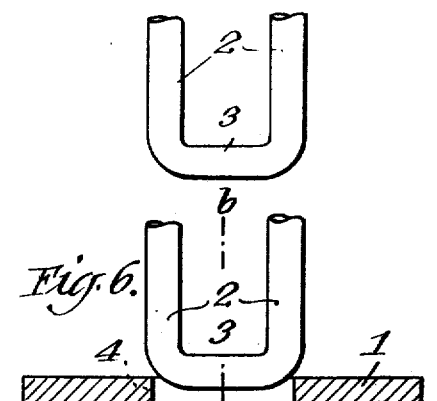
WITNESS
INVENTOR
Laurence S. Lachman
BY
ATTORNEY

UNITED STATES PATENT OFFICE.

LAURENCE S. LACHMAN, OF NEW YORK, N. Y.

ARTICLE OF MANUFACTURE OF METAL AND METHOD OF PRODUCING THE SAME.

1,314,816.      Specification of Letters Patent.      Patented Sept. 2, 1919.

Application filed February 8, 1918. Serial No. 215,975.

*To all whom it may concern:*

Be it known that I, LAURENCE S. LACHMAN, a citizen of the United States, and a resident of New York, in the county of New York and State of New York, have invented certain new and useful Improvements in Articles of Manufacture of Metal and Methods of Producing the Same, of which the following is a specification.

My invention relates to articles of manufacture of metal comprising a base element consisting of a plate or block of metal and a wire element connected therewith to form a composite structure.

The object of the invention is to produce a structure of the character above described in which a wire element projects from a face of the base element and is firmly joined therewith by a union of great strength.

A further object is to permit a structure of the character described to be cheaply manufactured.

To these ends my invention consists essentially in an article of manufacture composed of metal one element of which consists of a base or support and the other element of a piece of wire projecting from said base and welded thereto by a loop or bend of a wire welded in a slot in the base having closed ends as hereinafter more particularly described.

The invention further consists in the method of manufacturing articles of the above-described character by forming a slot in the base with closed ends, bending a wire to form a loop with projecting ends, assembling the loop and base with the loop of the wire element engaged with the edges of the slot at its sides and ends and uniting said elements by the electric welding process.

In the accompanying drawings:

Figure 1 is a side elevation of a composite structure embodying my invention.

Fig. 2 is a plan of Fig. 1.

Fig. 3 is a cross-section on the line *a—a* Fig. 1.

Fig. 4 is a plan of the base as slotted preparatory to the process of forming the union.

Fig. 5 is a side elevation of the wire element as bent preparatory to the process of welding.

Fig. 6 is a side view of the parts as assembled preparatory to the application of the heating current and pressure and Fig. 7 is a cross-section of said assembled elements on the line *b—b* Fig. 6.

1 in the accompanying drawings indicates any plate or block of metal forming the base element of the composite structure while 2 indicates the wire element projecting therefrom. Said element 2 consists of wire formed with a loop or bend 3 preferably elongated to some extent in the plane of the element 1, as shown, and having preferably two free legs or ends, as shown, for strength of the completed composite structure although, so far as the strength of union between elements 1 and 2 is concerned, one of said legs or branches might be omitted. The bending of the wire element into what may for convenience be described as a loop is preferably in a plane transverse to the plane of the plate or base 1. The bent or loop portion 3 is welded in a slot 4 having closed ends of the base 1, preferably by the electric welding process. The linear extent of the slot 4 is a little less than the linear extent of the outside of the loop or bend 3 as shown. The width of the slot 4 is somewhat less than the cross-sectional diameter of the wire as indicated clearly in Fig. 7, so that when the two elements are assembled as illustrated in Figs. 6 and 7, they may be readily united by the application of electric heating current and pressure applied transversely to the plane of the base 1, the bend or loop 3 of the wire being by this operation forced into the slot and united with the edges thereof both at its sides and ends to form the union substantially illustrated in Fig. 3. The electrode applied to the plate or base 1 is indicated in dotted line at 7 and in the operation the surface thereof applied to said plate serves to limit the movement of the wire, so that in the finished structure no portion of the wire will project beyond the surface of said plate or element 1.

Any desired means may be employed for clamping or applying current and pressure to and through the element 2 but as these means are well understood in the art they are not herein shown.

It is obvious that the shape of the side walls of the slot may be varied if desired, as for instance, they may have a taper or incline to give a larger opening on the side where the loop 3 is applied, thus allowing the loop portion 3 of the wire to enter more fully into the slot than is illustrated in Fig. 7.

Also, as will be readily understood, the relative width of the slot and the diameter of the wire may be such that the edges of the slot will engage further down upon the sides of the wire loop. Fig. 6 shows how the parts are relatively assembled for the welding operation, the loop of the wire being, as seen, substantially in a plane transverse to the plane of the base 1. For the best results, so far as strength of union is concerned, the operation should be carried to the point of forcing the loop of the wire into the slot so that the wire part will be substantially flush with the surface of the plate 1 on that side which is opposite the side to which the wire loop is applied.

What I claim as my invention is:—

1. Articles of manufacture of metal comprising a metal base element and a wire element having the wire element formed into a loop the bent or loop part of which is welded to the end and side edges in a slot in the base element as and for the purpose described.

2. An article of metal manufacture comprising a plate as a base element of a composite structure and a wire element projecting from the surface of said plate, said base element having an elongated slot and said wire element having a loop part elongated in the direction of the axis of the slot and welded therein to the side edges and to the end edges at the bends of the loop.

3. The method of manufacturing composite articles of metal having a base element and a wire element projecting therefrom, consisting in slotting the base element the ends of which are closed, forming a bend or loop of the wire element, assembling the parts with the loop engaged with the sides and ends of the slot and applying electric current and pressure to force the loop into the slot and weld it to the sides and ends thereof.

4. The method of manufacturing composite articles of metal having a base element and a wire element projecting therefrom, consisting in providing an elongated slot in the base element of less width than the diameter of the wire and with ends closed, forming a bend or loop of the wire element, assembling the parts with the loop engaged with the edges or corners of the slot at its side and ends and applying electric current and pressure to force the loop into the slot and weld it to the base element.

Signed at New York, in the county of New York and State of New York, this 7th day of February, A. D. 1918.

LAURENCE S. LACHMAN.

Witnesses:
F. B. TOWNSEND.
IRENE LEFKOWITZ.

Copies of this patent may be obtained for five cents each, by addressing the "Commissioner of Patents, Washington, D. C."